United States Patent
Grant et al.

(10) Patent No.: US 9,046,922 B2
(45) Date of Patent: Jun. 2, 2015

(54) PRODUCTS AND PROCESSES FOR PROVIDING MULTIMODAL FEEDBACK IN A USER INTERFACE DEVICE

(75) Inventors: Danny Grant, Montreal (CA); Christophe Ramstein, San Francisco, CA (US)

(73) Assignee: Immersion Corporation, San Jose, CA (US)

(*) Notice: Subject to any disclaimer, the term of this patent is extended or adjusted under 35 U.S.C. 154(b) by 2303 days.

(21) Appl. No.: 10/944,972

(22) Filed: Sep. 20, 2004

(65) Prior Publication Data

US 2006/0061558 A1    Mar. 23, 2006

(51) Int. Cl.
    *G06F 3/01*    (2006.01)

(52) U.S. Cl.
    CPC .................... *G06F 3/016* (2013.01)

(58) Field of Classification Search
    CPC ........................................... G06F 3/016
    USPC ................... 345/156, 161, 184, 163
    See application file for complete search history.

(56) References Cited

U.S. PATENT DOCUMENTS

| | | |
|---|---|---|
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,795,150 A | 3/1974 | Eckhardt |
| 3,902,687 A | 9/1975 | Hightower |
| 3,903,614 A | 9/1975 | Diamond et al. |
| 4,160,508 A | 7/1979 | Salsbury |
| 4,175,650 A | 11/1979 | Miller |
| 4,206,837 A | 6/1980 | Brown et al. |
| 4,236,325 A | 12/1980 | Hall et al. |
| 4,262,240 A | 4/1981 | Arai |
| 4,296,851 A | 10/1981 | Pierce |
| 4,400,790 A | 8/1983 | Chambers et al. |
| 4,513,235 A | 4/1985 | Acklam et al. |
| 4,553,080 A | 11/1985 | Cannon et al. |
| 4,560,983 A | 12/1985 | Williams |
| 4,581,491 A | 4/1986 | Boothroyd |
| 4,599,070 A | 7/1986 | Hladky et al. |
| 4,643,282 A | 2/1987 | Edl |
| 4,652,805 A | 3/1987 | Kohn |
| 4,706,294 A | 11/1987 | Ouchida |
| 4,708,656 A | 11/1987 | De Vries et al. |

(Continued)

FOREIGN PATENT DOCUMENTS

| | | |
|---|---|---|
| EP | 0111992 | 6/1984 |
| EP | 0349086 | 1/1990 |

(Continued)

OTHER PUBLICATIONS

U.S. Appl. No. 10/902,462, Olien, Not published.

(Continued)

*Primary Examiner* — Kevin M Nguyen
(74) *Attorney, Agent, or Firm* — Kilpatrick Townsend & Stockton LLP

(57) ABSTRACT

Products and processes for providing multimodal feedback in a user interface device are disclosed. In one exemplary embodiment, an apparatus comprises a manipulandum and an actuator in communication with the manipulandum. In one embodiment, the actuator may be operable to provide haptic feedback to the manipulandum and to produce an audible sound correlated with the haptic feedback.

11 Claims, 3 Drawing Sheets

(56) References Cited

U.S. PATENT DOCUMENTS

| | | |
|---|---|---|
| 4,713,007 A | 12/1987 | Alban |
| 4,718,529 A | 1/1988 | Kroeger et al. |
| 4,758,165 A | 7/1988 | Tieman et al. |
| 4,823,106 A | 4/1989 | Lovell |
| 4,859,922 A | 8/1989 | Tauchenitz et al. |
| 4,868,549 A | 9/1989 | Affinito et al. |
| 4,891,764 A | 1/1990 | McIntosh |
| 4,930,770 A | 6/1990 | Baker |
| 4,934,694 A | 6/1990 | McIntosh |
| 4,947,097 A | 8/1990 | Tao |
| 5,019,761 A | 5/1991 | Kraft |
| 5,022,407 A | 6/1991 | Horch et al. |
| 5,035,242 A | 7/1991 | Franklin |
| 5,038,089 A | 8/1991 | Szakaly |
| 5,059,842 A | 10/1991 | Uehara |
| 5,078,152 A | 1/1992 | Bond |
| 5,086,296 A | 2/1992 | Clark |
| 5,116,051 A | 5/1992 | Moncrief et al. |
| 5,116,180 A | 5/1992 | Fung et al. |
| 5,185,561 A | 2/1993 | Good et al. |
| 5,186,629 A * | 2/1993 | Rohen .................... 434/114 |
| 5,186,695 A | 2/1993 | Mangseth et al. |
| 5,187,630 A | 2/1993 | MacKay et al. |
| 5,189,355 A | 2/1993 | Larkins et al. |
| 5,191,320 A | 3/1993 | MacKay |
| 5,212,473 A | 5/1993 | Louis |
| 5,220,260 A | 6/1993 | Schuler |
| 5,240,417 A | 8/1993 | Smithson et al. |
| 5,270,689 A | 12/1993 | Hermann |
| 5,271,290 A | 12/1993 | Fischer |
| 5,275,174 A | 1/1994 | Cook |
| 5,299,810 A | 4/1994 | Pierce |
| 5,309,140 A | 5/1994 | Everett |
| 5,334,027 A | 8/1994 | Wherlock |
| 5,368,484 A | 11/1994 | Copperman et al. |
| 5,381,080 A | 1/1995 | Schnell et al. |
| 5,382,373 A | 1/1995 | Carlson et al. |
| 5,396,266 A | 3/1995 | Brimhall |
| 5,466,213 A | 11/1995 | Hogan |
| 5,492,312 A | 2/1996 | Carlson |
| 5,542,672 A | 8/1996 | Meredith |
| 5,547,382 A | 8/1996 | Yamasaki |
| 5,559,432 A | 9/1996 | Logue |
| 5,577,581 A | 11/1996 | Eberwein et al. |
| 5,578,238 A | 11/1996 | Weiss et al. |
| 5,580,249 A | 12/1996 | Jacobsen et al. |
| 5,591,082 A | 1/1997 | Jensen et al. |
| 5,665,946 A | 9/1997 | Nishijima et al. |
| 5,683,615 A | 11/1997 | Munoz |
| 5,705,085 A | 1/1998 | Munoz et al. |
| 5,711,746 A | 1/1998 | Carlson |
| 5,714,978 A | 2/1998 | Yamanaka et al. |
| 5,721,566 A | 2/1998 | Rosenberg et al. |
| 5,730,655 A | 3/1998 | Meredith |
| 5,766,016 A | 6/1998 | Sinclair |
| 5,767,836 A | 6/1998 | Scheffer et al. |
| 5,767,839 A | 6/1998 | Rosenberg |
| 5,781,172 A | 7/1998 | Engel et al. |
| 5,785,630 A | 7/1998 | Bobick et al. |
| 5,816,105 A | 10/1998 | Adelstein |
| 5,816,823 A | 10/1998 | Naimark et al. |
| 5,914,705 A | 6/1999 | Johnson et al. |
| 5,944,151 A | 8/1999 | Jakobs et al. |
| 5,999,168 A * | 12/1999 | Rosenberg et al. ........... 345/161 |
| 6,002,184 A | 12/1999 | Delson et al. |
| 6,008,800 A | 12/1999 | Pryor |
| 6,087,829 A | 7/2000 | Jager |
| 6,100,476 A | 8/2000 | Adamietz et al. |
| 6,111,577 A | 8/2000 | Zilles et al. |
| 6,128,006 A | 10/2000 | Rosenberg et al. |
| 6,147,422 A | 11/2000 | Delson et al. |
| 6,154,201 A | 11/2000 | Levin et al. |
| 6,211,861 B1 | 4/2001 | Rosenberg et al. |
| 6,215,470 B1 | 4/2001 | Rosenberg et al. |
| 6,219,034 B1 | 4/2001 | Elbing et al. |
| 6,243,078 B1 | 6/2001 | Rosenberg |
| 6,262,717 B1 | 7/2001 | Donohue et al. |
| 6,271,828 B1 | 8/2001 | Rosenberg et al. |
| 6,271,833 B1 | 8/2001 | Rosenberg et al. |
| 6,271,834 B1 | 8/2001 | May et al. |
| 6,283,859 B1 | 9/2001 | Carlson et al. |
| 6,307,285 B1 | 10/2001 | Delson et al. |
| 6,337,678 B1 | 1/2002 | Fish |
| 6,348,772 B1 | 2/2002 | May |
| 6,373,465 B2 | 4/2002 | Jolly et al. |
| 6,394,239 B1 | 5/2002 | Carlson |
| 6,400,352 B1 | 6/2002 | Bruneau et al. |
| 6,420,806 B2 | 7/2002 | Wittig |
| 6,422,941 B1 * | 7/2002 | Thorner et al. .................. 463/30 |
| 6,468,158 B1 | 10/2002 | Ootori et al. |
| 6,480,752 B1 | 11/2002 | Blume et al. |
| 6,486,872 B2 | 11/2002 | Rosenberg et al. |
| 6,522,755 B1 | 2/2003 | Warnaka et al. |
| 6,553,124 B2 | 4/2003 | Azima et al. |
| 6,589,117 B1 | 7/2003 | Moritome et al. |
| 6,591,175 B2 | 7/2003 | Numata et al. |
| RE38,242 E | 9/2003 | Engel et al. |
| 6,613,997 B2 | 9/2003 | Oster et al. |
| 6,636,202 B2 | 10/2003 | Ishmael, Jr. et al. |
| 6,637,311 B2 | 10/2003 | Barden |
| 6,640,940 B2 | 11/2003 | Carlson |
| 6,646,632 B2 | 11/2003 | Wegmuller et al. |
| 6,694,236 B2 * | 2/2004 | Onodera .................... 701/36 |
| 6,703,550 B2 * | 3/2004 | Chu .......................... 345/161 |
| 6,773,349 B2 * | 8/2004 | Hussaini et al. .............. 463/38 |
| 2001/0052893 A1 | 12/2001 | Jolly et al. |
| 2002/0044132 A1 | 4/2002 | Fish |
| 2002/0067336 A1 | 6/2002 | Wegmuller et al. |
| 2002/0084983 A1 | 7/2002 | Boldy |
| 2002/0158842 A1 | 10/2002 | Guy et al. |
| 2003/0006958 A1 | 1/2003 | Onodera |
| 2003/0038774 A1 | 2/2003 | Piot et al. |
| 2003/0079948 A1 | 5/2003 | Jolly et al. |
| 2003/0080939 A1 | 5/2003 | Kobayashi |
| 2003/0184518 A1 | 10/2003 | Numata et al. |
| 2004/0040800 A1 | 3/2004 | Anastas et al. |

FOREIGN PATENT DOCUMENTS

| | | | |
|---|---|---|---|
| EP | 0640902 A2 | 3/1995 | |
| JP | 01-003664 | 7/1990 | |
| JP | 02-109714 | 1/1992 | |
| JP | 04-007371 | 8/1993 | |
| JP | 05-193862 | 1/1995 | |
| WO | WO 0201491 A1 * | 1/2002 | ............ G06K 11/18 |

OTHER PUBLICATIONS

Adelstein, "Design and Implementation of a Force Reflecting Manipulandum for Manual Control research," DSC—vol. 42, Advances in Robotics, Edited by H. Kazerooni, pp. 1-12, 1992.

Adelstein, "A Virtual Environment System for the Study of Human Arm Tremor," Ph.D. Dissertation, Dept. of Mechanical Engineering, MIT, Jun. 1989.

Aukstakalnis et al., "Silicon Mirage: The Art and Science of Virtual Reality," ISBN 0-938151-82-7, pp. 129-180, 1992.

Badescu, "Rotary Haptic Knob for Vehicular Instrument Controls," Proceedings of the 10th Symp. on Haptic Interfaces for Virtual Envir. & Teleoperator Systs. (HAPTICS'02), 2002.

Baigrie, "Electric Control Loading—A Low Cost, High Performance Alternative," Proceedings, pp. 247-254, Nov. 6-8, 1990.

Bejczy et al., "A Laboratory Breadboard System for Dual-Arm Teleoperation," SOAR '89 Workshop, JSC, Houston, TX, Jul. 25-27, 1989.

Bejczy et al., "Kinesthetic Coupling Between Operator and Remote Manipulator," International Computer Technology Conference, The American Society of Mechanical Engineers, San Francisco, CA, Aug. 12-15, 1980.

Bejczy, "Generalization of Bilateral Force-Reflecting Control of Manipulators," Proceedings of Fourth CISM-IFToMM, Sep. 8-12, 1981.

(56) References Cited

OTHER PUBLICATIONS

Bejczy, "Sensors, Controls, and Man-Machine Interface for Advanced Teleoperation," Science, vol. 208, No. 4450, pp. 1327-1335, 1980.

Bejczy, et al., "Universal Computer Control System (UCCS) for Space Telerobots," CH2413-3/87/0000/0318501.00 1987 IEEE, 1987.

Brooks et al., "Hand Controllers for Teleoperation—A State-of-the-Art Technology Survey and Evaluation," JPL Publication 85-11; NASA-CR-175890; N85-28559, pp. 1-84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25-44, May 2, 1993.

Caldwell et al., "Enhanced Tactile Feedback (Tele-Taction) Using a Multi-Functional Sensory System," 1050-4729/93, pp. 955-960, 1993.

Colgate, J. Edward, et al., "Implementation of Stiff Virtual Walls in Force-Reflecting Interfaces," Department of Mechanical Engineering, Northwestern University, Evanston, IL, Sep. 1993.

"Cyberman Technical Specification," Logitech Cyberman SWIFT Supplement, Apr. 5, 1994.

Eberhardt et al., "Including Dynamic Haptic Perception by the Hand: System Description and Some Results," DSC—vol. 55-1, Dynamic Systems and Control: vol. 1, ASME 1994.

Eberhardt et al., "OMAR—A Haptic display for speech perception by deaf and deaf-blind individuals," IEEE Virtual Reality Annual International Symposium, Seattle, WA, Sep. 18-22, 1993.

Gobel et al., "Tactile Feedback Applied to Computer Mice," International Journal of Human-Computer Interaction, vol. 7, No. 1, pp. 1-24, 1995.

Gotow et al., "Controlled Impedance Test Apparatus for Studying Human Interpretation of Kinesthetic Feedback," WA11-11:00, pp. 332-337.

Howe, "A Force-Reflecting Teleoperated Hand System for the Study of Tactile Sensing in Precision Manipulation," Proceedings of the 1992 IEEE International Conference on Robotics and Automation, Nice, France, May 1992.

IBM Technical Disclosure Bulletin, "Mouse Ball-Actuating Device With Force and Tactile Feedback," vol. 32, No. 9B, Feb. 1990.

Iwata, "Pen-based Haptic Virtual Environment," 0-7803-1383-1/93 IEEE, pp. 287-292, 1993.

Jacobsen et al., "High Performance, Dextrous Telerobotic Manipulator With Force Reflection," Intervention/ROV '91 Conference & Exposition, Hollywood, Florida, May 21-23, 1991.

Jones et al., "A perceptual analysis of stiffness," ISSN 0014-4819 Springer International (Springer-Verlag); Experimental Brain Research, vol. 79, No. 1, pp. 150-156, 1990.

Kaczmarek et al., "Tactile Displays," Virtual Environment Technologies.

Kontarinis et al., "Display of High-Frequency Tactile Information to Teleoperators," Telemanipulator Technology and Space Telerobotics, Won S. Kim, Editor, Proc. SPIE vol. 2057, pp. 40-50, Sep. 7-9, 1993.

Marcus, "Touch Feedback in Surgery," Proceedings of Virtual Reality and Medicine The Cutting Edge, Sep. 8-11, 1994.

McAffee, "Teleoperator Subsystem/Telerobot Demonstrator: Force Reflecting Hand Controller Equipment Manual," JPL D-5172, pp. 1-50, A1-A36, B1-B5, C1-C36, Jan. 1988.

Minsky, "Computational Haptics: The Sandpaper System for Synthesizing Texture for a Force-Feedback Display," Ph.D. Dissertation, MIT, Jun. 1995.

Ouhyoung et al., "The Development of a Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Ouh-Young, "Force Display in Molecular Docking," Order No. 9034744, p. 1-369, 1990.

Ouh-Young, "A Low-Cost Force Feedback Joystick and Its Use in PC Video Games," IEEE Transactions on Consumer Electronics, vol. 41, No. 3, Aug. 1995.

Patrick et al., "Design and Testing of a Non-reactive, Fingertip, Tactile Display for Interaction with Remote Environments," Cooperative Intelligent Robotics in Space, Rui J. deFigueiredo et al., Editor, Proc. SPIE vol. 1387, pp. 215-222, 1990.

Pimentel et al., "Virtual Reality: through the new looking glass," $2^{nd}$ Edition; McGraw-Hill, ISBN 0-07-050167-X, pp. 41-202, 1994.

Rabinowitz et al., "Multidimensional tactile displays: Identification of vibratory Intensity, frequency, and contactor area," Journal of the Acoustical Society of America, vol. 82, No. 4, Oct. 1987.

Russo, "Controlling Dissipative Magnetic Particle Brakes in Force Reflective Devices," DSC—vol. 42, Advances in Robotics, pp. 83-70, ASME 1992.

Russo, "The Design and Implementation of a Three Degree of Freedom Force Output Joystick," MIT Libraries Archives Aug. 14, 1990, pp. 1-131, May 1990.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Exploration, Rensselaer Polytechnic Institute, Sep. 30-Oct. 1, 1992.

Snow et al., "Model-X Force-Reflecting-Hand-Controller," NT Control No. MPO-17851; JPL Case No. 5348, pp. 1-4, Jun. 15, 1989.

Stanley et al., "Computer Simulation of Interacting Dynamic Mechanical Systems Using Distributed Memory Parallel Processors," DSC—vol. 42, Advances in Robotics, pp. 55-61, ASME 1992.

Tadros, "Control System Design for a Three Degree of Freedom Virtual Environment Simulator Using Motor/Brake Pair Actuators", MIT Archive © Massachusetts Institute of Technology, pp. 1-88, Feb. 1990.

Terry et al., "Tactile Feedback in a Computer Mouse," Proceedings of Fourteenth Annual Northeast Bioengineering Conference, University of New Hampshire, Mar. 10-11, 1988.

Difiliippo D. et al., "The AHI: An Audio and Haptic Interface for Contact Interactions," University of British Colombia, Vancouver, Canada, CHI Letters, 2000, vol. 2, 2, pp. 149-158.

Yano, H. et al., "AudioHaptics: Audio and Haptic Rendering Based on a Physical Model," University of Tsukuba, IEEE, 2004, pp. 250-257.

"Force Feedback Touch Panel," SMK Corporation, Apr. 2002.

"NxtTechnologyReview.01," Jan. 2002, pp. 1-28.

* cited by examiner

US 9,046,922 B2

PRODUCTS AND PROCESSES FOR PROVIDING MULTIMODAL FEEDBACK IN A USER INTERFACE DEVICE

FIELD OF THE INVENTION

The present invention generally relates to products and processes for providing multimodal feedback.

BACKGROUND

Haptic cues and feedback enhance the human-machine interface. Providing haptic feedback increases the amount of information available to a user in the operation of a device. Sight and hearing are two other important senses that individuals rely on to interact effectively with the outside world. As a source of feedback, however, sound has generally been attenuated or suppressed.

While increasing the number of sensory cues may be expected to enhance the human-machine interface, this has not been implemented effectively thus far. One reason that multimodal feedback (e.g., haptic and aural feedback together) has not been adopted, is that current means of providing aural and haptic cues may provide disparate sensory feedback to the user. In some devices, aural cues may be a by-product of means for producing haptic feedback and uncontrolled, i.e., aural feedback may not be designed to be a part of, or added to, the overall effect.

Where aural cues are used together with haptic cues, the aural feedback may be provided remotely from the source of the haptic feedback. For example, in a gaming environment, haptic feedback may be provided to a manipulandum, such as a joystick or gamepad. Aural feedback in such an environment may be provided through loudspeakers through a gaming control set or through loudspeakers proximate to a visual monitor or display. Current wired and wireless controllers allow a user to be several feet from the source of the aural feedback. Aural feedback provided to a user from a distance generally may not correlate well with related haptic feedback. Thus, such an arrangement leaves the user of a simulated environment with a somewhat unrealistic, and therefore less than satisfactory, experience.

SUMMARY

The present invention provides products and processes for providing multimodal feedback in a user interface device. In one exemplary embodiment of the present invention, an apparatus may comprise a manipulandum and an actuator in communication with the manipulandum. In one embodiment, the actuator may be operable to provide haptic feedback to the manipulandum and to produce an audible sound correlated with the haptic feedback.

This exemplary embodiment is mentioned not to limit the invention, but to provide an example of an embodiment of the invention to aid understanding. Exemplary embodiments are discussed in the Detailed Description, and further description of the invention is provided there. Advantages offered by the various embodiments of the present invention may be understood by examining this specification.

BRIEF DESCRIPTION OF THE DRAWINGS

The accompanying drawings, which constitute part of this specification, help to illustrate embodiments of the invention. In the drawings, like numerals are used to indicate like elements throughout.

DETAILED DESCRIPTION

Embodiments of the present invention include products and processes for providing multimodal feedback in a user interface device. In some interface devices, cutaneous feedback (such as, without limitation, vibration, texture, and heat) is also provided to the user, in addition to kinesthetic feedback (such as, without limitation, forces or resistances sensed by muscles, tendons, and/or joints) both subsumed under the phrase, and more generally known collectively as "haptic feedback." The present invention may be embodied in handheld devices, such as gamepads, joysticks, knobs, computer mice, mobile phones, personal digital assistants ("PDAs"), camcorders, and other devices.

Figure 1:
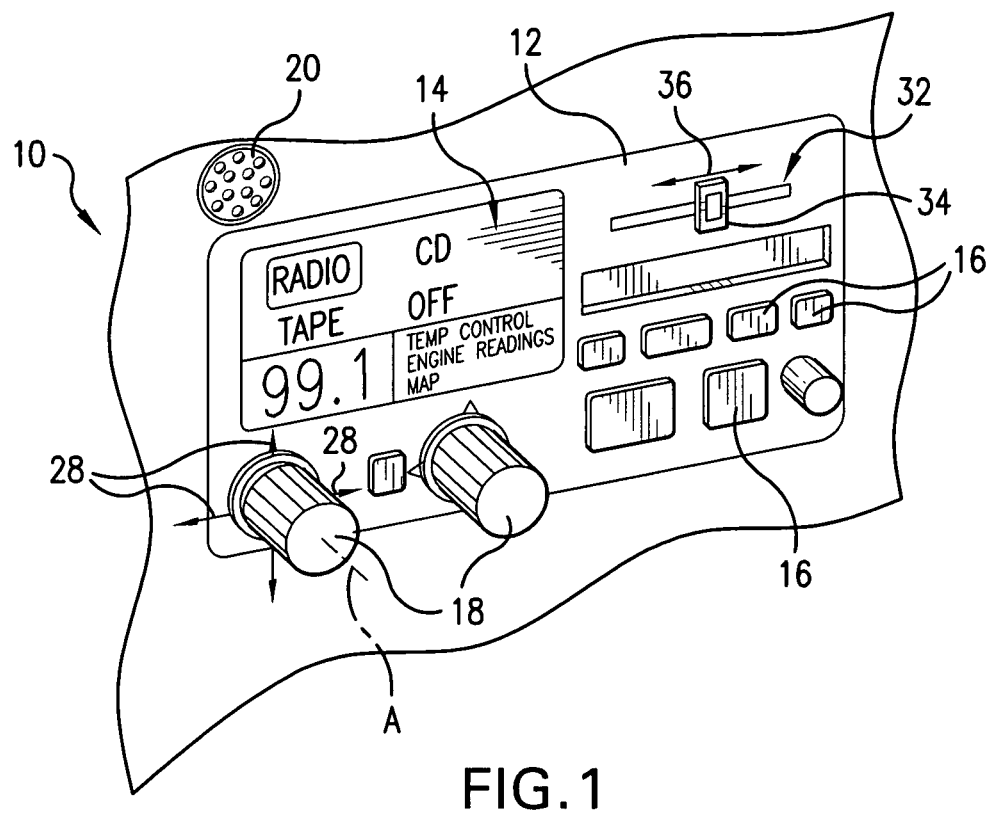
FIG. 1 shows a perspective, cutaway view of device according to an embodiment of the present invention.

Referring now to FIG. 1, a perspective, cutaway view of an apparatus according to an embodiment of the present invention is shown. The apparatus may comprise device 10. In the described embodiment, device 10 may comprise an audio device operable to transmit sound from one or more signals, such as cassette tapes, compact discs (CDs) or other optical discs, or radio signals transmitted from a broadcasting station or satellite.

The device 10 is not limited to an audio device, but is described herein as such simply for illustrative purposes. The present invention may be used in a wide variety of other user interface systems, such as gaming systems, mobile telephones, digital photographic devices, and electronic calendar or schedule organizer devices, e.g., so-called personal digital assistants (PDAs), among others.

Device 10 may be physically coupled to the control panel 12. Alternatively, device 10 may be physically remote from the control panel 12, and communicate with the device 10 using signals transferred through wires, cables, wireless transmitters/receivers, etc.

Device 10 may include a front panel 12, a display 14, and at least one manipulandum (e.g., user interface device), such as buttons 16 and control knobs 18, and loudspeaker 20. Front panel 12 may be mounted, for example, on an interior of a vehicle, such as on or below a dashboard, or in some other suitable area. Alternatively, the front panel 12 may be an external surface of a housing of the device itself, such as a stereo unit.

Control knobs 18, in the described embodiment, may be generally cylindrical objects, which may be engaged and manipulated by a user. The knobs 18 may alternatively be implemented as a variety of different objects, including conical shapes, spherical shapes, dials, cubical shapes, rods, etc., and may have a variety of different textures on their circumferential surfaces, including bumps, lines, grooves, or other grips, or even projections or members extending from the circumferential surface.

A user may grip or contact a circumferential surface of the knob 18 and rotate it a desired amount. Haptic feedback may be provided in this rotary degree of freedom in some embodiments, as described in further detail below.

Furthermore, the control knobs 18 may allow additional control functionality for a user. The knobs may be operable to be moved by a user in one or more directions approximately perpendicular to the axis of rotation, e.g., parallel to the surface of the front panel 12 as shown in FIG. 1. This transverse motion or direction is indicated by arrows 28. For example, the knob 18 may be moved in the four orthogonal directions shown, or may be moveable in eight directions spaced at 45 degree intervals about axis A.

A manipulandum may also include a slider control 32. The slider control 32 may comprise a slider knob 34, which may be adapted to be grasped by a user and moved in a linear direction as indicated by arrow 36. Alternatively, the slider knob 34 may be manipulated in other suitable directions or degrees of freedom.

As with control knob 18, the slider control 32 may include haptic feedback functionality through an actuator (not shown). As a user moves the slider knob 34, force sensations such as a spring force, a damping force, jolts, detents, textures, or other haptic feedback may be output and felt by a user.

Other suitable manipulanda and haptics can be used. For example, U.S. Pat. No. 6,686,911 illustrates suitable knob control devices including force feedback for use in embodiments of the present invention. U.S. Pat. No. 6,686,911, assigned to the assignee of the present invention, is incorporated in its entirety herein by reference.

Still referring to FIG. 1, an apparatus, such as the device 10, according to an embodiment of the present invention may comprise a manipulandum. In the embodiment shown, the manipulandum may comprise a control knob, such as knob 18 or slider knob 34. In an alternate embodiment, the manipulandum may comprise a gamepad (shown in FIG. 3).

The apparatus also may comprise an actuator (not shown) operable to provide haptic feedback to the knob 18, 34. A variety of suitable actuators may be used, such as a voice coil and permanent magnet or a direct current (DC) motor with a spinning mass. Other suitable actuators may be used, such as, for example, piezoelectric ceramics, piezoelectric films, and electroactive polymers. Alternatively, passive (or resistive) actuators may be used, such as, for example, magnetic particle brakes, friction brakes, or pneumatic/hydraulic passive actuators. Passive actuators generally may generate a damping resistance or friction in a degree of motion.

The haptic feedback output on the knob 18, 34 may include a variety of different force sensations. The haptic feedback may be integrally implemented with the control functions performed by the knob 18, 34. Basic force sensations are force detents that are output at particular positions of the knob 18, 34 to inform a user how much the knob 18, 34 has been displaced and/or to designate a particular position of the knob 18, 34.

The force detents may be simple jolts or bump forces to indicate the detent position, or the detents may include forces that attract the knob 18, 34 to the particular detent position and resist movement of the knob away from that position. For example, the position may correspond to a particular radio station frequency or other setting, thus making selection easier for a user. Furthermore, several force sensations may be combined together to provide multiple simultaneous force effects.

The apparatus also may comprise an audio source disposed proximate to the manipulandum. In the embodiment shown in FIG. 1, the audio source 20 may comprise a loudspeaker 20. The loudspeaker 20 may be disposed proximate to both knobs 18, 34. In one embodiment, the loudspeaker 20 may be disposed less than approximately ten centimeters from each of the knobs 18, 34.

The apparatus may also comprise a processor (not shown) operable to send an actuating signal to the actuator and an audio signal to the audio source, e.g., the loudspeaker 20. The audio signal may correlate with the haptic feedback. The audio signal may cause the loudspeaker 20 to produce an audible sound. The audio signal may be correlated with the haptic feedback in both time and in the nature of the sound.

The loudspeaker 20 may produce an audible sound at the same time that the actuator provides haptic feedback to the knob 18, 34. The loudspeaker 20 also may produce an audible sound that correlates with, or is consistent with, the nature of the haptic feedback. For example, a crisp, abrupt sound (e.g., staccato) may correlate with a haptic effect indicating a wall or end of travel as opposed to smooth and flowing sound (e.g., legato). Thus, sound that correlates with haptic feedback reinforces and enhances a user's haptic experience.

The processor may be disposed in a suitable location according to the needs of the device in which it is placed. In one embodiment, the processor may be local to the device, i.e., disposed proximate to or within the device housing. In another embodiment, the processor may be remote from the device. A remote processor may communicate with the actuator and/or audio source through wires or by wireless means.

Additionally, the processor may comprise a first processor and a second processor (not shown). In one embodiment, the first processor may control the second processor. For example, the first processor may communicate instructions to the second processor, which then processes and transmits those instructions to the actuator and/or audio source.

Furthermore, the first and second processors both may be disposed locally. In another embodiment, the first processor may be disposed remotely (i.e., separate from the device 10), while the second processor may be disposed locally. The first and second processors may communicate through wires or wirelessly.

Such processors may include a microprocessor, an Application Specific Integrated Circuit (ASIC), and state machines. Such processors may include, or may be in communication with media, for example computer readable media, which store instructions that, when executed by the processor, cause the processor to perform the steps described herein as carried out, or assisted, by a processor.

One embodiment of a suitable computer readable medium includes an electronic, optical, magnetic, or other storage or transmission device capable of providing a processor, such as the processor in a web server, with computer readable instructions. Other examples of suitable media include, but are not limited to, a floppy disc, CD-ROM, magnetic disc, memory chip, ROM, RAM, ASIC, configured processor, all optical media, all magnetic tape or other magnetic media, or any other medium from which a computer processor can read. Also, various other forms of computer readable media may transmit or carry instructions to a computer, including a router, private or public network, or other transmission device or channel.

In one embodiment, a computer readable medium may comprise instructions, that, when executed, cause a processor to perform the steps of generating an audio signal to produce an audible sound from an actuator in communication with a manipulandum and sending the audio signal to the actuator. The audible sound may correlate with a haptic effect communicated to the manipulandum. In one embodiment, the haptic effect may be produced by the actuator.

In one embodiment, the computer readable medium may further comprise instructions, that, when executed, cause the processor to perform the steps of generating an actuating signal to provide haptic effect to the manipulandum and sending the actuating signal to the actuator. In one embodiment, the actuator comprises an audio source. In another embodiment, the actuator may be in communication with a loudspeaker disposed less than approximately ten centimeters from the manipulandum.

Figure 2:
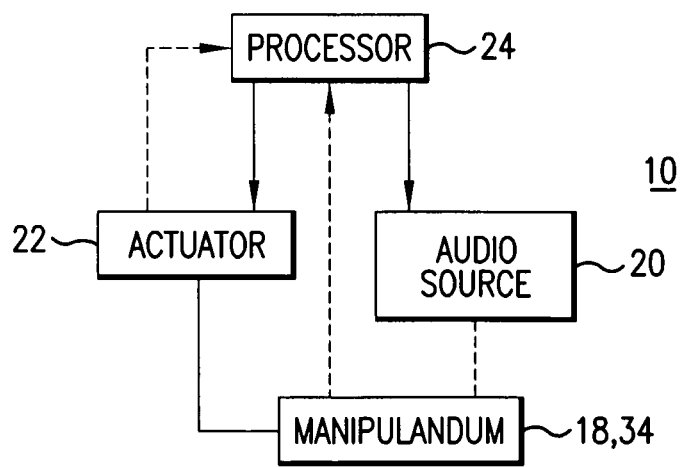
FIG. 2 shows a block diagram of the embodiment of the present invention shown in FIG. 1.

Referring now to FIG. 2, a block diagram of the embodiment of the device 10 of FIG. 1 is shown. As indicated in FIG. 2, the device 10 may comprises a manipulandum, such as control knob 18 and slider knob 34, as described above. The device 10 may comprise an actuator 22, which is operable to provide haptic feedback to the manipulandum 18, 34.

In an embodiment, the actuator 22 may be disposed in communication with the manipulandum 18, 34. The terms "communicate" or "communication" mean to mechanically, electrically, optically, or otherwise contact, couple, or connect by either direct, indirect, or operational means. As described above, a wide variety of actuators may be used.

The device 10 may also comprises an audio source 20. The audio source 20 may be disposed proximate to the manipulandum 18, 34. In one embodiment, the audio source is disposed less than approximately ten centimeters from the manipulandum 18, 34. In one embodiment, the audio source 20 may comprise a loudspeaker. In another embodiment, the actuator 22 may comprise the audio source 20. In one embodiment, for example, the actuator 22 may also be the audio source 20, thus eliminating the need for a separate component for the audio source 20. In one embodiment (not shown), the actuator 22 may be in communication with the audio source 20. Alternatively, other suitable audio sources may be used.

The device 10 may comprise a processor 24 operable to send an actuating signal to the actuator 22 and an audio signal to the audio source 20. In one embodiment, the processor 24 may send the actuating signal and the audio signal to the actuator 22. The actuator 22 may produce electronically modulated forces, which means that processor 24 may control the application of the forces to manipulandum 18, 34. Information regarding the characteristics of the actuator 22 may be communicated from the actuator 22 to the processor 24.

In an embodiment, the processor 24 may be disposed in communication with the actuator 22 and the audio source 20. In one embodiment, different input signals communicated from manipulandum 18, 34 to the processor 24 may generate different actuation signals and different audio signals.

In another embodiment, different input devices may be configured to provide different input signals. In other embodiments, the processor 24 may include an algorithm that may be configured to provided desired haptic feedback and audible sounds in response to designated input signals or series of input signals.

Sensors (not shown) may sense the position, motion, and/or other characteristics (including changes and rates of change) of the manipulandum 18, 34 along one or more degrees of freedom and provide signals to the processor 24, including information representative of those characteristics. The sensors may be integral to manipulandum 18, 34, or separate from and in communication with manipulandum 18, 34. In one embodiment, a sensor may be provided for each degree of freedom along which manipulandum 18, 34 may be moved. In another embodiment, a single compound sensor may be used for multiple degrees of freedom. Both absolute and relative sensors may be used.

The audio signal may correlate with the haptic feedback provided to the manipulandum. As described above, the audio signal may cause the audio source 20 to produce an audible sound that may correlate with the haptic feedback in both time and the nature of the haptic effect.

Figure 3:
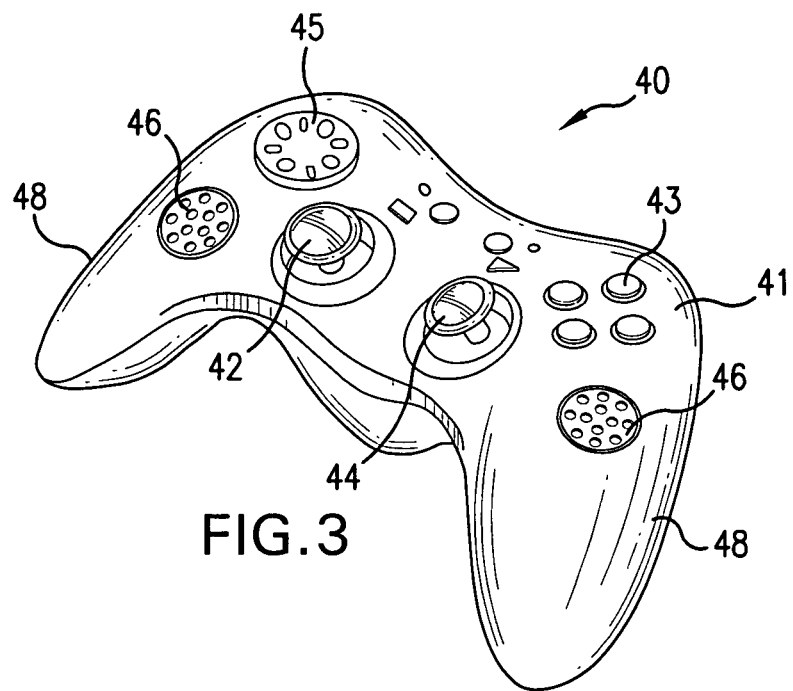
FIG. 3 shows a perspective view of a device according to another embodiment of the present invention.

Referring now to FIG. 3, a perspective view of an apparatus according to another embodiment of the present invention is shown. The apparatus may comprise a gamepad 40. An input surface 41 of the gamepad 40 may comprise a manipulandum 42. The manipulandum 42 may include one or more of buttons 43, a directional controller 45, and joysticks 44. Alternatively, other suitable number, combination, or configuration of manipulanda 42 may be used. The gamepad 40 also may include two wings 48 to facilitate grasping the device with two hands.

The gamepad 40 also may comprise an actuator (not shown) in communication with the manipulandum 42. In one embodiment, the actuator may be in communication with a loudspeaker 46. The actuator may comprise a direct current (DC) motor. The actuator may be operable to provide haptic feedback to the manipulandum 42 and to produce audible sound. The actuator may also serve as an audio source in communication with the loudspeaker 46. The audible sound may correlate with the haptic feedback. As described above, the audible sound may correlate with the haptic feedback in both time and nature of the haptic effect.

In one embodiment, the gamepad 40 may further comprise a processor (not shown) in communication with the actuator. In one embodiment, the processor may be in communication with the loudspeaker 46. In another embodiment, the actuator may be in communication with the loudspeaker 46.

The processor may be operable to send a signal to the actuator and/or the loudspeaker 46. In one embodiment, the signal may comprise an actuating signal and an audio signal. In another embodiment, the signal comprising an actuating signal and an audio signal may be sent to the actuator only.

The processor may be disposed in a suitable location according to the needs of the device in which it is placed. In one embodiment, the processor may be local to the gamepad 40, i.e., disposed proximate to or within the gamepad 40 housing. In another embodiment, the processor may be remote from the gamepad 40. A remote processor may communicate with the actuator and/or audio source through wires or by wireless means.

Additionally, the processor may comprise a first processor and a second processor (not shown). In one embodiment, the first processor may control the second processor. For example, the first processor may communicate instructions to the second processor, which then may process and transmit those instructions to the actuator and/or audio source.

Furthermore, the first and second processors both may be disposed locally. In another embodiment, the first processor may be disposed remotely (i.e., separate from the gamepad 40), while the second processor may be disposed locally. The first and second processors may communicate through wires or wirelessly. The processors may be as that described above. Alternatively, other suitable processors may be used.

Figure 4:
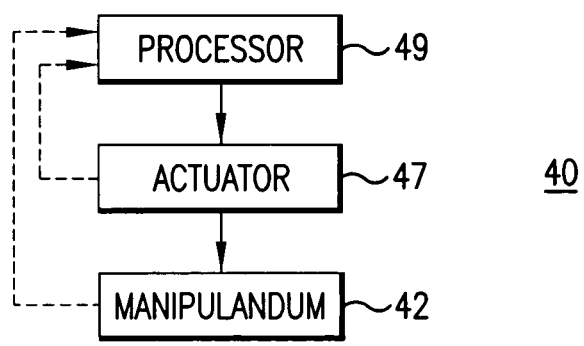
FIG. 4 shows a block diagram of the embodiment of the present invention shown in FIG. 3.

Referring now to FIG. 4, a block diagram of the embodiment of the gamepad 40 of FIG. 3 is shown. As indicated in FIG. 4, the gamepad 40 may comprise a manipulandum 42, such as buttons 43, a directional controller 45, and joysticks 42, 44, as described above. The device 10 may comprise an actuator 47, which may be operable to provide haptic feedback to the manipulandum 42.

In an embodiment, the actuator 47 may be disposed in communication with the manipulandum 42. The actuator 47 may be operable to provide haptic feedback to the manipulandum 42 and to produce an audible sound. Thus, in this embodiment, the actuator 47 may provide both haptic and audible feedback. In such an embodiment, there may be no need for a separate loudspeaker. The audible sound may correlate with the haptic feedback provided to the manipulandum in both time and nature of the haptic effect.

The gamepad 40 may comprise a processor 49 operable to send a signal to the actuator 47. In one embodiment, the signal comprises an actuating signal and an audio signal. Thus, the actuator 47 may produce or emit an audible sound as well as electronically modulated forces. The processor 49 may control application of the forces to manipulandum 42. In an embodiment, the processor 49 may be disposed in communication with the actuator 47. Information regarding the characteristics of the actuator 47 may be communicated from the actuator 47 to the processor 49.

In one embodiment, different input signals communicated from manipulandum 42 to the processor 49 may generate different actuating signals. In another embodiment, different input devices may be configured to provide different input signals. In other embodiments, the processor 49 may include an algorithm that is configured to provided desired haptic feedback and audible sounds in response to designated input signals or series of input signals.

Sensors (not shown) may sense the position, motion, and/ or other characteristics (including change and rates of change) of the manipulandum 42 along with one or more degrees of freedom and may provide signals to the processor 49, including information representative of those characteristics. The sensors may be integral to manipulandum 42, or separate from and in communication with manipulandum 42. In one embodiment, a sensor may be provided for each degree of freedom along which manipulandum 42 may be moved. In another embodiment, a single compound sensor may be used for multiple degrees of freedom. Both absolute and relative sensors may be used.

Figure 5:
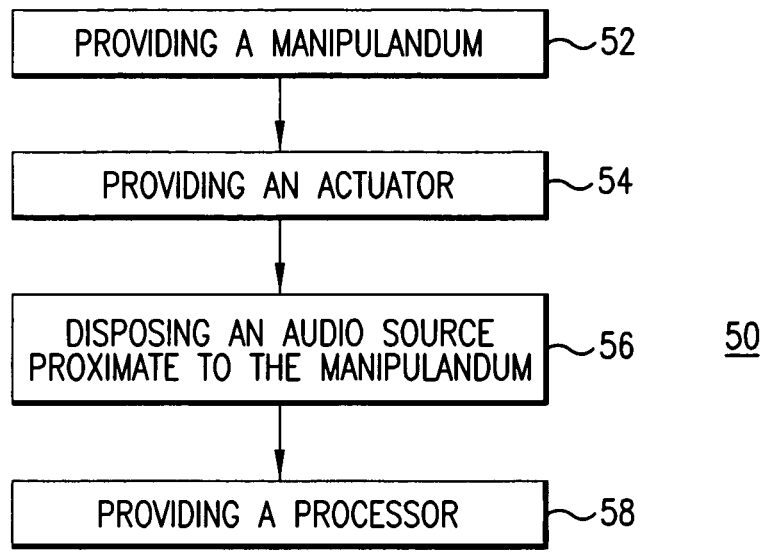
FIG. 5 shows a block diagram of a method according to an embodiment of the present invention.

Referring now to FIG. 5, a method 50 according to an embodiment of the present invention is shown. The method 50 may be employed to make a device that provides multimodal feedback (e.g., haptics and sound) in a user interface device, such as the devices 10,40, as described above. Items shown in FIGS. 1-4 may be referred to in describing FIG. 5 to aid understanding of the method 50 shown. However, embodiments of method 50 according to the present invention may be used to make a wide variety of devices.

Referring now to FIG. 5, block 52 indicates that method 50 may comprise providing a manipulandum. The manipulandum may be as that described above. Alternatively, other suitable manipulanda may be used. Block 54 indicates that method 50 may comprise providing an actuator. The actuator may be operable to provide haptic feedback to the manipulandum. In one embodiment, the actuator may comprise a DC motor. In another embodiment, the actuator may comprise a voice coil. Other suitable actuators may be used, including those described above. In an embodiment, the actuator may be in communication with the manipulandum.

Block 56 indicates that method 50 may comprise disposing an audio source proximate to the manipulandum. In an embodiment, the audio source may comprise a loudspeaker. In another embodiment, the audio source may comprise the actuator. The actuator may be in communication with the loudspeaker. Alternatively, other suitable audio sources may be used. In one embodiment, the audio source may be disposed less than approximately ten centimeters from the manipulandum.

As indicated by block 58, method 50 may comprise providing a processor. The processor may be operable to send an actuating signal to the actuator and an audio signal to the audio source. In one embodiment, the processor may be operable to send both the actuating signal and the audio signal to the actuator. The audio signal may correlate with the haptic feedback. The processor may be similar to that described above. Alternatively, other suitable processors may be used. As described above, correlating the audio signal with the haptic feedback refers to sound that may be consistent with the haptic feedback in both time and in the nature of the sound. Thus, such multimodal feedback (e.g., haptics and sound) may reinforce and enhance a user's experience and interface with an interface device.

In one embodiment, different input signals communicated from the manipulandum to the processor may generate different actuating signals. In another embodiment, different input devices may be configured to provide different input signals. In other embodiments, the processor may include an algorithm that may be configured to provided desired haptic feedback and audible sounds in response to designated input signals or series of input signals.

Figure 6:
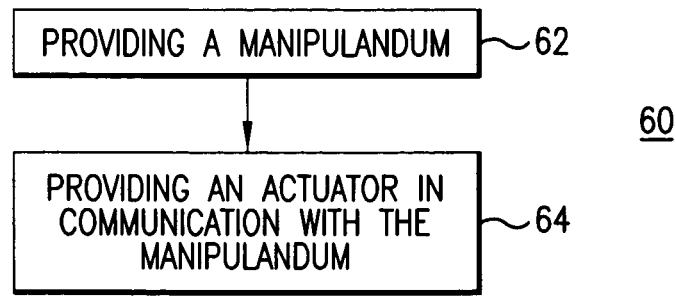
FIG. 6 shows a block diagram of a method according to another embodiment of the present invention.

Referring now to FIG. 6, a method 60 according to another embodiment of the present invention is shown. The method 60 may be used to make a device that provides multimodal feedback (e.g., haptics and sound) in a user interface device, such as the devices 10,40 as described above. Items shown in FIGS. 1-4 may be referred to in describing FIG. 6 to aid understanding of the method 60 shown. However, embodiments of method 60 according to the present invention may be used to make a wide variety of devices.

Referring now to FIG. 6, block 62 indicates that method 60 may comprise providing a manipulandum. The manipulandum may be as that described above. Alternatively, other suitable manipulanda may be used.

Block 64 indicates that method 60 may comprise providing an actuator in communication with the manipulandum. The actuator may be operable to provide haptic feedback to the manipulandum and to produce an audible sound. The sound may correlate with the haptic feedback. In this embodiment, the actuator may provide both haptic and audible feedback. In one embodiment, the actuator may comprise a DC motor. In another embodiment, the actuator may comprise a voice coil. Other suitable actuators may be used, including those described above.

In one embodiment, the method 60 may further comprise providing a processor in communication with the actuator. The processor may be operable to send a signal to the actuator. The processor may be similar to that described above. Alternatively, other suitable processors may be used.

In one embodiment, the signal may comprise an actuating signal and an audio signal. In such an embodiment, the processor may communicate the actuating signal and the audio signal to the actuator.

In one embodiment, different input signals communicated from the manipulandum to the processor may generate different actuating signals. In another embodiment, different input devices may be configured to provide different input signals. In other embodiments, the processor may include an algorithm that is configured to provided desired haptic feedback and audible sounds in response to designated input signals or series of input signals.

While the present invention has been disclosed with reference to certain embodiments, numerous modifications, alterations, and changes to the described embodiments are possible without departing from the sphere and scope of the present invention, as defined by the appended claims. Accordingly, it is intended that the present invention not be limited to That which is claimed:

1. An apparatus comprising:

a manipulandum;

an actuator in communication with the manipulandum, the actuator operable to provide haptic feedback to the manipulandum, to communicate information regarding the characteristics of the actuator to a processor, and to produce an audible sound correlated with the haptic feedback, wherein the actuator is configured to receive an actuator signal and an audio signal, the actuator signal operative to cause the actuator to provide the haptic feedback and the audio signal operative to cause the actuator to produce the audible sound correlated with the haptic feedback;

a second actuator, the second actuator configured to receive a second actuator signal and a second audio signal, the second actuator signal operative to cause the actuator to provide a second haptic feedback and the second audio signal operative to cause the actuator to produce a second audible sound correlated with the second haptic feedback.

2. The apparatus of claim 1 further comprising a processor in communication with the actuator, the processor operable to send the actuator signal and the audio signal to the actuator.

3. The apparatus of claim 2, wherein the manipulandum comprises a gamepad.

4. The apparatus of claim 1 wherein the actuator comprises at least one of a direct current motor, a voice coil, a piezoelectric actuator, or an electroactive polymer.

5. The apparatus of claim 1, further comprising a gaming system in communication with the manipulandum, and the actuator.

6. The apparatus of claim 1, wherein the actuator is mounted inside a vehicle.

7. The apparatus of claim 1, wherein the manipulandum comprises a first manipulandum and further comprising a second manipulandum disposed proximate to the first manipulandum.

8. A method comprising: receiving an input signal from a manipulandum;

determining an actuator signal and an audio signal based at least in part on the input signal;

transmitting the actuator signal and the audio signal to an actuator in communication with the manipulandum, the actuator operable to provide haptic feedback to the manipulandum based on the actuator signal, to communicate information regarding the characteristics of the actuator to a processor, and to produce an audible sound based on the audio signal and correlated with the haptic feedback; and receiving a second actuator signal and a second audio signal, the second actuator signal operative to cause a second actuator to provide a second haptic feedback and the second audio signal operative to cause the actuator to produce a second audible sound correlated with the second haptic feedback.

9. The method of claim 8 further comprising providing a processor in communication with the actuator, the processor operable to receive the input signal, and to determine and transmit the actuator signal and the audio signal.

10. The method of claim 8, wherein the actuator comprises at least one of a direct current motor, a voice coil, a piezoelectric actuator, or an electroactive polymer.

11. A non-transitory computer readable medium comprising instructions, that, when executed, cause a processor to perform the steps of:

receiving an input signal from a manipulandum;

determining an actuator signal and an audio signal based at least in part of the input signal;

transmitting the actuator signal and the audio signal to an actuator in communication with the manipulandum, the actuator operable to provide haptic feedback to the manipulandum based on the actuator signal, to communicate information regarding the characteristics of the actuator to a processor, and to produce an audible sound based on the audio signal and correlated with the haptic feedback; and receiving a second actuator signal and a second audio signal, the second actuator signal operative to cause a second actuator to provide a second haptic feedback and the second audio signal operative to cause the actuator to produce a second audible sound correlated with the second haptic feedback.

* * * * *

UNITED STATES PATENT AND TRADEMARK OFFICE
CERTIFICATE OF CORRECTION

| | | |
|---|---|---|
| PATENT NO. | : 9,046,922 B2 | Page 1 of 1 |
| APPLICATION NO. | : 10/944972 | |
| DATED | : June 2, 2015 | |
| INVENTOR(S) | : Danny Grant et al. | |

It is certified that error appears in the above-identified patent and that said Letters Patent is hereby corrected as shown below:

Title page, item (56),

Page 2, Column 1, Under "US Patent Documents" continuing Column 2, Line After "6,773,349", please insert -- 7,198,137  4/2007  Olien --.

Page 3, Under "Other Publications" Column 2, Line 27, Please delete "83", please insert -- 63 --.

In the Claims

Column 9, Line 19 approx., After "the audible sound correlated with the haptic feedback;", please insert -- and --.

Signed and Sealed this
Ninth Day of February, 2016

Michelle K. Lee
*Director of the United States Patent and Trademark Office*